8742X
B. F. Snyder,
Saw-Mill Head-Block.
Patented Apr 3, 1835.
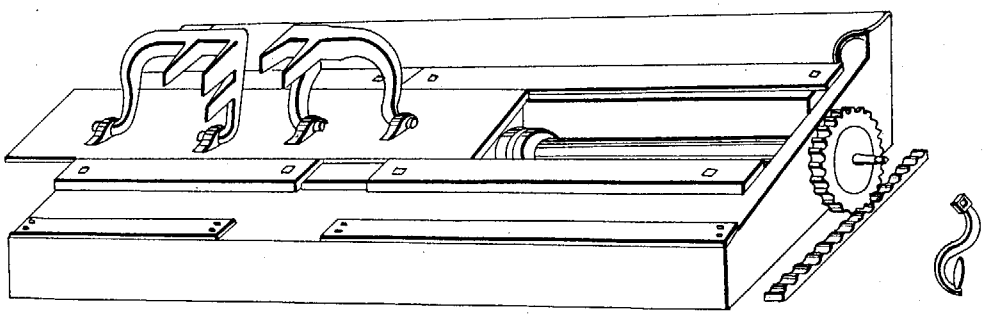
Inventor:
B F Snyder
AM. PHOTO-LITHO. CO. N.Y. (OSBORNE'S PROCESS)

ar : 14

Dated Apl. 3. 1835 901.

8742X Benjamin F. Snyder, Painted Post, N. York.

Letters Patent

The schedule referred to in these Letters Patent, and making part of the same containing a description in the words of the said Benjamin F. Snyder himself of his improvement in the construction of the dog blocks of saw mills —

---

Be it known that I, Benjamin F. Snyder of the Town of Painted Post, Steuben County, and State of New York have invented a new and useful improvement in the construction of the Dog Blocks for saw mills, which invention has not been before known or used and which is as follows —

The said invention consists of a sliding appartus working in rebated guides on the blocks over which is hung a shaft or roller of sufficient size to be strong and of sufficient length to saw the width of any log. The shaft or roller is made fast at each end by two raised posts or boxes which are attached to the sides, the shaft or roller may be fastened to the posts or boxes by inserting pins on the outside through the roller or by a setting screw or keys through the boxes or otherwise - On the slide is attached a segment of angling cogs, by which motion is communicated to the slide by the means of a spiral cog wheel on a shaft laying parallel with this slide and on the end of this shaft is a vertical spur cog wheel made to work in segments of cogs teeth confined to the floor of the mill or confined in timbers as circumstances may require -

The vertical cog wheel is made to move on a turned post of the shaft, the moving of the carriage of the mill towards the saw the vertical cog wheel is at liberty to revolve, the shaft remaining stationary and on the running back of the carriage the log is moved by means of a racket made fast to the shaft, the dogs or clicks on the vertical cog wheel take hold of the notches of the racket wheel & the desired thickness of the timber to be sawed is obtained by varying the the length of the segments of cogs to be used as before mentioned The whole of the machine may be constructed of cast or wrought iron or part of cast and a part of wrought iron or of wood & iron or any other metallic substances — The parts which I claim as being the inventor is the entire propelling power of the machine together with the spiral spring & the